United States Patent Office 2,716,102
Patented Aug. 23, 1955

2,716,102

VINYLCINNAMALACETOPHENONE POLYMERS

Cornelius C. Unruh and Charles F. H. Allen, Rochester, N. Y., assignors to Eastman Kodak Company, Rochester, N. Y., a corporation of New Jersey No Drawing. Application September 13, 1951, Serial No. 246,515

10 Claims. (Cl. 260—64)

This invention relates to the preparation of acylated vinyl polymers and more particularly to light-sensitive cinnamic aldehyde derivatives of such polymers.

In the Allen et al. U. S. patent application Serial No. 771,142, filed August 28, 1947, now U. S. Patent 2,566,302, granted September 4, 1951, are described light-sensitive polymers made by the acylation of a polymer such as polystyrene with cinnamoyl chloride. Since acylation apparently proceeds to a limited extent before insolubilization occurs, a copolymer is obtained having the following general structure:

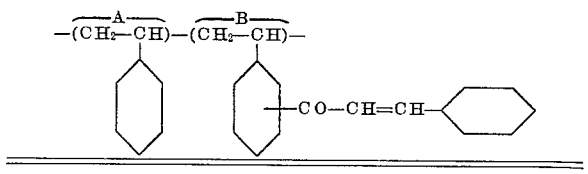

By this method polymers are obtained having good light sensitivity and solvent solubility only when the molecular proportion of units A to units B are from 5:1 to 18:1 (from about 16 to 5 mol percent of vinylbenzalaceophenone groups).

We have discovered that if polymers of this type are prepared by a different method, they are not only more soluble in organic solvents but are more sensitive to light. Presumably, these improved characteristics are due to the fact that our process is capable of incorporating a comparatively larger number of light-sensitive groups into a resin molecule and does not cause any substantial number of cross-linkages to be formed between polymeric chains. Moreover, the polymers of the invention contain in the light-sensitive grouping two conjugated double bonds which tend to improve light-sensitive characteristics in particular.

We prepare the polymers of our invention by condensing polymers of acylated vinylbenzenes and naphthalenes with cinnamic aldehydes. We preferably prepare these polymers by condensing a polymer of vinylacetophenone or acetonaphthone with a cinnamic aldehyde. This is accomplished in several ways. A polymer containing aromatic nuclei such as polystyrene or polyvinyl naphthalene or a copolymer of styrene or vinylnaphthalene is partially or completely acylated by the Friedel-Crafts reaction and the resultant vinylacetophenone or acetonaphthone polymer is then condensed with, preferably but not necessarily, an excess of the cinnamic aldehyde to yield the vinylcinnamalacetophenone or acetonaphthone polymer. Alternately, a vinylacetophenone or acetonaphthone monomer can be homopolymerized or copolymerized with other compounds containing a polymerizable —CH=C< or $CH_2$=C< group such as styrene, and the resultant polymer condensed with the cinnamic aldehyde.

The following reactions illustrate methods for carrying out our invention.

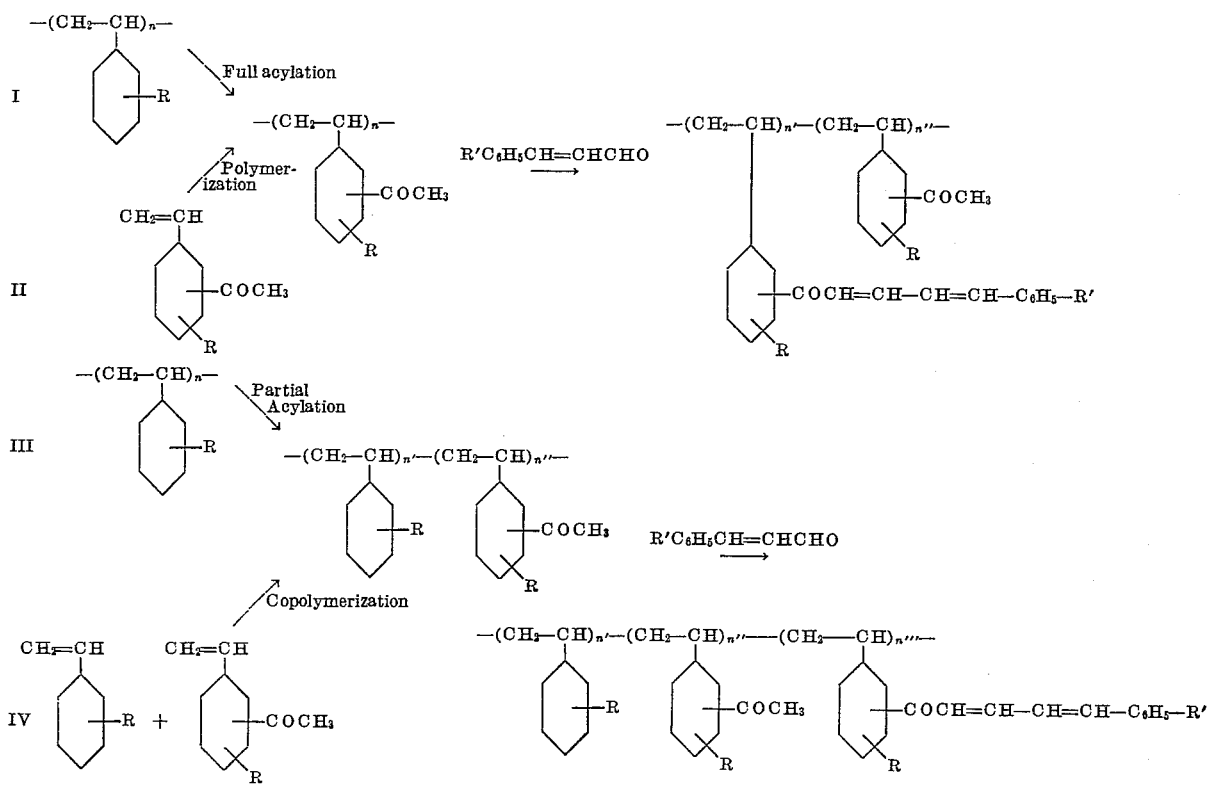

R represents a group such as hydrogen, alkoxy and aryloxy, e. g. o-methoxy, p-phenoxy, alkyl, e. g. m-tert.-butyl and methyl, hydroxy, e. g. o-hydroxy, halogen, e. g. o-chloro, aralkyl, e. g. p-benzyl. The nucleus can also be substituted with more than one of such groups, e. g. 3,4-dichloro-, 2,5-dichloro-, 2,5-dimethyl-, 3,4-dihydroxy-, 2,3-dimethyl-. Similarly, such substituents may be present on a naphthalene nucleus when preparing the acylated vinylnaphthone polymers. When the polymer reacted with the aldehyde or mixture of aldehydes is obtained by acylation of a vinylbenzene or naphthalene polymer (methods I and III), the acid halide used may be any one or a mixture of those containing from 2 to 5 carbon atoms, such as acetyl-, propionyl-, butyryl-, and valeryl chlorides. Acetyl chloride is preferred since the vinylcinnamalacetophenone and acetonaphthone polymers are more light-sensitive than, for example, the vinylcinnamalpropiophenone polymers. Likewise, according to methods II and IV, the carbon chain of the ketone group of the monomeric compound preferably contains 2 to 5 carbon atoms. The Williams U. S. patent application Serial No. 246,524, filed concurrently herewith, provides a convenient method for preparing these ketones for example, form p-ethylacetophenone. When R of the acylated compounds is amino, hydroxyl, sulfo and carboxyl, methods II and IV and the Williams procedure for preparing the ketone monomer is used. R' represents one or more substituents on the phenoyl group such as o-methoxy, o-hydroxy, p-hydroxy, o-sulfo, o-chloro, etc. In the formulas in the above chart, the values for the integers $n$, $n'$, $n''$ and $n'''$ are dependent somewhat upon the molecular weight of the polymer reacted with the cinnamic aldehyde. In methods I, II, III and IV, $n''$ can be positive integers, or equal to zero in case all of the acetyl groups of the polymer have been reacted with the aldehyde as shown in the examples following. In the formulas above it will be apparent that when a mixture of aldehydes including cinnamic aldehyde is reacted with the acylated polymer, the resultant polymer contains a mixture of vinylaralacetophenone units. When the polymers of the invention are obtained as described regardless of the derivation of the particular polymer which is condensed with the aldehyde, the resultant products in general are more sensitive to light than those prepared by the methods of the Allen et al. invention. Sensitivity to light is determined by exposure of a layer of the polymer on a hydrophilic surface under the photographic step tablet to insolubilize the polymer in the exposed regions. After exposure the least exposed areas are removed with a solvent for the polymer such as methyl ethyl ketone. The sensitometric characteristics of the undissolved polymer remaining in the form of a step tablet are then recorded by well-known photographic methods. From these values a speed value is assigned to the particular polymer under test. When tested by this method, representative polymers of th Allen et al. invention (made by reacting 1:5 to 1:18 mols of cinnamoyl chloride per mol of styrene polymer) possess speeds of from 1.4 to 7. None of the polymers of our invention has speeds less than 7 and speeds of the order of 2500 can readily be obtained by selection of the proper reactants and conditions of reaction.

As mentioned, a possible explanation for the fact that the polymers of our invention are more soluble and in general possess relatively higher light sensitivity lies partly in the belief that substantially no cross-linkages are obtained in the polymers prepared by our methods. That is, it is believed that when a polymer containing aromatic nuclei is cinnamoylated by the methods of the Allen et al. invention, the catalyst utilized induces the formation of cross-linkages which reduce light-sensitivity and which tend to insolubilize the polymer before very many cinnamoyl groups have been introduced into the molecule. On the contrary, by our methods we start from a polymer containing the desired proportion, preferably, of vinylacetophenone units. Subsequently reaction of the polymer with the aldehyde appears to yield a polymer substantially free of cross-linkages.

In general, the polymers of our invention contain combined polymeric units of the general structure

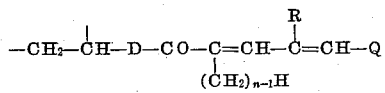

where $n$ represents a positive integer from 1 to 4, Q represents an aryl group of the benzene series, substituted or not, and D represents a single bond, or an aryl group of the benzene or naphthalene series, preferably of the benzene series, substituted or not, R represents hydrogen or an alkyl group such as ethyl, amyl etc. preferably of from 1 to 5 carbon atoms.

Polymers of the following are given as representative of those useful in our invention:

Cinnamalacetylstyrene
α-n-Amylcinnamalacetylstyrene
p-Chlorocinnamalacetylstyrene
m-Nitrocinnamalacetylstyrene
o-Chlorocinnamalacetylstyrene
p-Methoxycinnamalacetylstyrene
p-Methylcinnamalacetylstyrene
p-Cholorocinnamalacetyl-o-methoxystyrene
p-Methoxycinnamalacetyl-o-methoxystyrene
p-Methylcinnamalacetyl-o-chlorostyrene
Benzalcinnamalacetylstyrene
Cinnamalamethylvinylketone As is apparent, these polymers are obtained by condensing a cinnamic aldehyde with a selected polymer containing acetyl groups.

The latter compound is representative of light-sensitive cinnamal group-containing polymers made by condensing cinnamic aldehydes with polymers containing acyl groups such as vinylmethylketone polymers and copolymers. Other polymers also containing acetyl groups attached directly or indirectly to linear carbon atom polymer chains are utilized similarly. Benzalcinnamalacetylstyrene is representative of polymers obtained by reacting a mixture of aldehydes with the polymer containing acetyl groups.

In general, the preferred polymers are obtained by condensing a polymer (homopolymer or copolymer) of a compound having the general formula

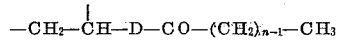

wherein D represents a single bond or an aryl group of the benzene series and $n$ represents a whole number from 1 to 4.

More particularly, the preferred polymers are obtained by condensing a cinnamic aldehyde with a polymer of a compound having the general formula $$CH_2=CH-D-CO-CH_3$$

wherein D represents an aryl group of the benzene series. Preferably, but not necessarily, is used an excess of the aldehyde based upon the amount of vinylacetophenone unit present in the polymer molecule.

As described above, specific methods include acetylating, either partially or fully, aromatic nuclei of a styrene polymer (homopolymer or copolymer), then condensing acetyl groups thereof with a cinnamic aldehyde. Alternately, an acetylated styrene copolymer is obtained by copolymerization of a mixture of a vinylacetophenone with a compound containing a polymerizable —CH=C< or CH₂=C< group followed by condensing acyl groups of the copolymer with the selected aldehyde or mixture of aldehydes. Other acetyl-containing polymers are utilized similarly.

Condensation of the vinylacetophenone or naphthone polymer with the aldehyde is carried out in the presence of a dehydration catalyst such as phosphorous pentoxide, toluene sulfonic acid, acetic anhydride mineral acid, for example, sulfuric acid, phosphoric acid, etc., and basic condensation catalyst, particularly organic bases such as the quaternary ammonium bases, for example, trimethylbenzyl ammonium hydroxide, tetramethyl and tetraethyl ammonium hydroxides, trimethyl benzylammonium butoxide, sodium hydroxide, sodium methoxide etc.

As will be apparent from the following examples given as illustrative of the methods of our invention, condensation with the aldehyde is preferably conducted in the presence of a diluent which should be a solvent for both the vinylacetophenone or naphthone polymer and the aldehyde in use such as 1,4-dioxane or a ketone such as benzophenone, etc. It is particularly desirable to use as the solvent large excesses of the aldehyde in addition to the primary solvent or to use only the aldehyde reactant as the solvent which increases the amount of acyl groups reacted with the aldehyde. It is desirable to use a diluent, otherwise in some cases the product tends to decrease in solubility during the course of the condensation. It is possible to employ as the diluent the original diluent used when making the vinylacetophenone polymer or copolymer. That is, when vinylacetophenone, for example, is homopolymerized or copolymerized with another polymerizable compound in a diluent, the polymer need not be isolated but the polymerization mixture can immediately be reacted with the desired aldehyde without removal of the diluent. Any unpolymerized monomer which may remain in the polymerization mixture does no harm when condensation is subsequently carried out in its presence. As a source of the aldehyde for the condensation reaction may be used the pure aldehydes or mixtures of two or more aldehydes can be used and the aldehyde may be furnished by a cinnamic aldehyde acetal or diacetate. These compounds readily decompose in the presence of the condensation catalyst to yield the corresponding cinnamic aldehyde.

Typical cinnamic aldehydes which may be used for reaction with the acylated polymers are as follows:

α-n-Amylcinnamic aldehyde
α-Chlorocinnamic aldehyde
α-Bromocinnamic aldehyde
o-Nitrocinnamic aldehyde
p-Nitrocinnamic aldehyde
p-Chlorocinnamic aldehyde
m-Nitrocinnamic aldehyde
o-Chlorocinnamic aldehyde
p-Hydroxycinnamic aldehyde
p-Hydroxy-m-methoxycinnamic aldehyde
p-Isopropylcinnamic aldehyde
o-, m-, or p-Methylcinnamic aldehydes
o-, m-, or p-Methoxycinnamic aldehydes

*Example 1.—The preparation of polyvinylacetophenone*

In an all-glass vessel equipped with efficient stirrer, dropping funnel and reflux condenser was placed 268 g. (2 mols) of finely divided anhydrous aluminum chloride and 1 liter of carbon disulfide. To the constantly stirred suspension was added 118 g. (1½ mol) of acetyl chloride followed by a solution of 104 g. (1 mol) of polystyrene in 1 liter of carbon disulfide. Addition of the polymer solution took about 15 minutes. The reaction mixture became warm and refluxed gently, with copious evolution of hydrogen chloride. No artificial heating or cooling was used. After about ½ hour, the evolution of hydrogen chloride had greatly diminished, but stirring was continued for another hour. The reaction mixture was then filtered by suction, about 75% of the carbon disulfide used was thus recovered, and the residue on the filter consisted of highly swollen discrete particles. These were dried rapidly in a gentle current of air to give a dust yellow powder, which was thoroughly agitated with cold 5% hydrochloric acid for about 15 minutes. The polymer was filtered off and washed by stirring in several changes of cold water. On drying at 40–50° C. there was obtained 142–144 g. of a fine, white powder of low ash content. The analysis of this product showed a carbon content of 81.9% and a hydrogen content of 6.9%. The calculated values for pure polyvinyl acetophenane are C=82.2%, H=6.85%.

The above polymer, proven to consist essentially of polyvinyl-p-acetophenone, may be further purified by dissolving it in acetone and pouring the colorless, slightly hazy solution into an excess of agitated water. The white, fibrous precipitate is again washed with water and dried. Found C=82.3, H=7.0.

The other acylated nuclear substituted styrene and vinylnaphthalene polymers indicated above are prepared in this manner from the appropriate styrene or vinylnaphthalene polymer. Also, these polymers can be obtained by polymerizing o-, m-, or p-vinylacetophenones and acetonaphthones prepared by the method of the Williams invention above.

*Example 2.—The condensation of polyvinylacetophenone and cinnamaldehyde*

Ten grams of polyvinylacetophenone was dissolved in a mixture of 220 cc. glacial acetic acid and 30 g. cinnamaldehyde. To this solution was added 10 g. of a 10% solution (by weight) of concentrated sulfuric acid in glacial acetic acid. This solution was allowed to stand at room temperature in a brown bottle.

After three hours one-half of the above solution was poured into an excess of ethyl alcohol which was vigorously stirred. The near-whtie fibrous precipitate was leached in several changes of ethyl alcohol until the odor of cinnamaldehyde was removed. The product was dried in subdued light at room temperature. Finally, the polymer was again dissolved in methyl ethyl ketone and this solution poured into an excess of 3A alcohol. The isolated polymer was leached in fresh alcohol and again dried in the dark.

After five hours' standing, the remainder of the reaction mixture was worked up as described above.

Another reaction mixture as described above (using one-half of the quantities described was allowed to stand for eight hours, then methods worked up as described. The analyses, as estimated by infra-red adsorption, and sensitometric data are given below:

| Time of Reaction | Mol Percent Substitution | Speed |
|---|---|---|
| 3 hours | 4.6 | 320 |
| 5 hours | 8.9 | 1,600 |
| 8 hours | 10.3 | 2,500 |

*Example 3.—The condensation of polyvinylacetophenone with excess cinnamaldehyde*

Five grams of polyvinylacetophenone was dissolved in 100 g. of cinnamaldehyde. To the solution was added 5.0 g. of a 10% solution (by weight) of concentrated sulfuric acid in glacial acetic acid. The solution was allowed to stand at room temperature in a brown bottle for five hours, then it was poured into an excess of stirred methanol. The precipitate was reprecipitated from methyl ethyl ketone solution into methanol and finally from methyl ethyl ketone solution into warm water. The yellowish-green fibrous polymer was dried in the dark at room temperature. This material has a sensitometric speed of 2500. The analysis of the resultant polymer was made with difficulty particularly by infra-red adsorption methods due to the high coloration of the polymer; however, it was estimated that the polymer was highly reacted with cinnamic aldehyde.

*Example 4.—Condensation of polyvinylacetophenone with cinnamaldehyde*

Ten grams of polyvinylacetophenone (Example 1) were dissolved in 190 g. of cinnamaldehyde. While stirring the solution a few drops of phenolphthalein solution were added followed by a dropwise addition of approximately 40% solution of trimethyl benzyl ammonium hydroxide until the indicator showed a reddish brown color. One ml. of the alkaline solution was then added in excess, and the solution allowed to stir for five minutes. Another 2 ml. of the basic solution were then added and the solution allowed to stir a further three minutes. Thereupon, the solution was acidified with a little glacial acetic acid whereupon the color changed to a yellow. The solution was then poured into an excess of methanol with agitation. The precipitate was then twice precipitated into stirred methanol from a methyl ethyl ketone solution. The fibrous precipitate was dried in the dark at room temperature. The sensitometric speed of this polymer was 280.

*Example 5.—The condensation of polyvinylacetophenone with a mixture of benzaldehyde and cinnamaldehyde*

Five grams of polyvinylacetophenone was dissolved in a mixture of 55 g. of cinnamaldehyde and 40 g. of benzaldehyde. To this was added 5.0 g. of a 10% solution (by weight) of concentrated sulfuric acid in benzaldehyde. The solution turned dark green in color in a short time. After four hours at room temperature (30–32° C.) the solution was poured into an excess of stirred methanol. The yellow fibrous precipitate was leached in fresh methanol, then twice reprecipitated from methyl ethyl ketone solution in methanol. Finally reprecipitated from methyl ethyl ketone solution into warm water. Dried at room temperature in the dark. The sensitometric speed of this material was 1400.

*Example 6.—The condensation of polyvinylacetophenone with p-methoxy-cinnamaldehyde*

Five grams of polyvinylacetophenone were dissolved in a mixture of 80 g. of glacial acetic acid and 20 g. of p-methoxy-cinnamaldehyde. To this solution was added 5.0 g. of a 10% solution (by weight) of concentrated sulfuric acid in glacial acetic acid. The solution was stored in a brown bottle at room temperature (30° C.) for two hours, and then 10 g. of a 10% solution (by weight) of anhydrous sodium acetate in glacial acetic acid were added to the solution to destroy the catalyst. The solution (a very dark color green) was poured into an excess of methanol with stirring. The yellow fibrous precipitate was leached in fresh methanol and redissolved in methyl ethyl ketone. This solution, after filtering, was again poured into methanol. The precipitate was now dissolved in methyl ethyl ketone and poured into warm water, leached in cold water, pressed out and dried. The product had a sensitometric speed of 1100.

*Example 7.—The condensation of polyvinylacetophenone with α-n-amylcinnamaldehyde*

Five grams of polyvinylacetophenone were dissolved in a mixture of 20 g. of α-n-amylcinnamaldehyde and 80 g. of glacial acetic acid. To this solution was added 5.0 g. of a 10% (by weight) solution of concentrated sulfuric acid in glacial acetic acid. After eight hours at 30–32° C. the catalyst was destroyed by the addition of 10 g. of a 10% (by weight) solution of anhydrous sodium acetate in glacial acetic acid. The solution was poured slowly into an excess of stirred methanol. The precipitate was dissolved in methyl ethyl ketone and this solution was poured into an excess of hot water. The fibrous precipitate was leached in cold water, pressed out and dried. The product was light sensitive.

*Example 8.—The condensation of an acetylated copolymer of styrene and isobutylene with cinnamaldehyde*

Five grams of acetylated equimolar copolymer of styrene and isobutylene (Example 11) were dissolved in a mixture of 80 g. of 1,4-dioxane and 20 g. of cinnamaldehyde. To this was added 5.0 g. of a 10% solution (by weight) of concentrated sulfuric acid in glacial acetic acid. After 25 hours at 28° C., the solution was treated with 10 g. of a 10% solution of sodium acetate in glacial acetic acid, and then poured into a large excess of methanol. The precipitate was redissolved in methyl ethyl ketone, and precipitated into warm water, then dried at 40° C. The sensitometric speed of this polymer was low.

*Example 9.—The preparation of partially acetylated polystyrene*

Fifty-two grams of polystyrene were dissolved in 500 cc. of carbon disulfide. This was added to a suspension of 62 g. of anhydrous aluminum chloride in 500 cc. of carbon disulfide contained in a 3-liter glass flask equipped with an efficient glass stirrer, condenser and dropping funnel. While the mixture was being vigorously stirred, a mixture of 30 g. of acetyl chloride and 100 cc. of carbon disulfide were added dropwise. During this addition the reaction mixture soon became thick and gelatinous and another 500 cc. of carbon disulfide were added. Stirring was continued and more of the acid chloride mixture was cautiously added and soon the gel structure collapsed and a suspension of highly swollen polymer particles was obtained. The remainder of the acid chloride was then added at a faster rate. Evolution of hydrogen chloride was observed and stirring was continued for another hour after the addition of the acid chloride was complete. The mixture was then filtered and dried in a current of air. The product was broken up and added to a well-stirred ice cold 5% hydrochloric acid solution. The suspension was filtered off and washed with water and dried. The white dry polymer was dissolved in dioxane, the solution filtered and the filtrate was poured slowly into an excess of agitated methanol. The white fibrous precipitate was washed thoroughly with water, then dried at 40° C.

*Example 10.—The condensation of a copolymer of vinylacetophenone and styrene with cinnamaldehyde*

Five grams of a partially acetylated polystyrene (Example 9) were dissolved in a mixture of 80 g. of 1,4-dioxane and 20 g. of cinnamaldehyde. To this was added 5.0 g. of a 10% solution of concentrated sulfuric acid in glacial acetic acid. After eight hours' reaction at 28° C. there was added 10 g. of a 10% solution of sodium acetate in glacial acetic acid and the resulting mixture was precipitated into excess methanol. The fibrous precipitate was washed in running water for three hours, then dried at room temperature. This polymer had a sensitometric speed of 5000.

*Example 11.—Preparation of a copolymer of vinylacetophenone and isobutylene*

One-hundred sixty g. of a copolymer of styrene and isobutylene (consisting of essentially equimolecular proportions of the two monomers) were dissolved in 1 liter of carbon disulfide. In a 5-l. flask fitted with an efficient glass stirrer, condenser and dropping funnel was suspended 268 g. of anhydrous aluminum chloride in 1 liter of carbon disulfide. To this was then added 118 g. of acetyl chloride. While this suspension was well stirred, the solution of the polymer was added over a period of ten minutes. Copious evolution of hydrogen chloride took place and a loose bulky precipitate formed. After the addition of the polymer was complete, stirring was continued for another hour. The product was filtered and the crumbly polymer dried in a current of air. The dried polymer was crushed up fine and stirred up with an excess of ice cold 5% hydrochloric acid solution. The polymer was filtered off by suction and washed thoroughly with water to remove excess acid. Dried at 40° C. Yield about 180 grams.

*Example 12.—The preparation of monomeric vinyl acetophenone*

Polyvinylacetophenone (prepared by the reaction of acetyl chloride with polystyrene in the presence of anhydrous aluminum chloride, as described in Example 1 and in the Kenyon et al. U. S. application, Serial No.

246,519, filed concurrently herewith), was heated in a distilling apparatus with the bare flame of a gas burner, the system being evacuated to 1 mm. pressure. 85% yield of a light brown oil was obtained which readily crystallized on chilling. This product was redistilled and a very pale yellow oil was collected which distilled at 93–98° C. at 0.5 mm. Hg pressure.

The distillate crystallized and this was recrystallized twice from ligroin (B. P. 60–90° C.) by chilling the solution thoroughly. White crystalline plates were obtained which melted at 34° C. Titration of a sample of this for double bond by means of bromine indicated a 98.9% content of vinylacetophenone.

The isomeric vinylacetophenone and acetonaphthones can also be prepared by the methods of the mentioned Williams invention.

*Example 13.—The copolymerization of vinylacetophenone with styrene*

Five grams of vinylacetophenone prepared as in Example 12 were mixed with 3.6 g. of freshly distilled styrene together with 0.043 g. of benzoyl peroxide and 25 cc. of methyl ethyl ketone. This solution was refluxed gently on the steam bath for 24 hours. The resulting viscous, clear, colorless solution was poured into an excess of agitated methanol. The white, friable polymer was leached in fresh methanol, then dried at 40° C. Found: C=84.1%, H=7.2%. Calculated: C, 86.4%, H, 7.2%.

When this copolymer was condensed with the cinnamic aldehydes indicated above, polymers possessing good solubility and light-sensitivity were obtained and possessed properties similar to the polymer of Example 10 obtained from acetylated polystyrene.

*Example 14.—Condensation of polyvinylacetophenone with cinnamaldehyde*

Five grams of polyvinylacetophenone were dissolved in a mixture of 100 g. benzophenone and 50 g. cinnamaldehyde. To the solution was added 10 g. of a 10% (by weight) solution of concentrated sulfuric acid in glacial acetic acid. The mixture was allowed to stand in a brown bottle in the dark for 48 hours at room temperature (30–33° C.). Thereupon the acid catalyst was destroyed by the addition of 20 g. of a 10% solution of sodium acetate in acetic acid. The dark viscous solution was poured in a thin stream into an excess of agitated methanol. The greenish yellow precipitate was leached thoroughly in several changes of methanol and then washed in running cold water in the dark. The product, dried at room temperature in the dark, weighed 8.8 g. The sensitivity of this material was extremely high. The polymer was substantially free of unreacted acetyl groups.

In analyzing the benzalvinylacetophenone and acetonaphthone polymers for their content of benzal groups, two methods were used. The first involved titration of the double bond in the polymer with bromine. The second method which appeared to be most reliable involved recording the spectral absorption in a spectral photometer at wave lengths 7.35 and 7.50 microns. Using the absorption of the solvent, chloroform, for fixing the I₀ level and the absorption of benzalacetophenone for comparison. The analyses shown in the above examples were based on the latter method.

In addition to the vinylacetophenone polymers given in the above examples can be used for condensation with the aldehydes, acylated polymers, e. g. of m-methyl-, 2,5-dimethyl-, α-methyl-, ethyl-, o-hydroxy-, o-, m-, p-chloro- or bromo-, p-benzyl-, 3,4-dichloro-, 3,4-dimethoxy-, m-tert. butylstyrenes; o- and m-methoxy styrenes, p-phenoxy styrene, etc., and copolymers of mixtures of 5–95 mol. percent of these styrenes and of these styrenes with polymerizable compounds such as styrene, acrylonitrile, acrylic and alkacrylic acids and esters, maleic anhydride, etc. The homologous vinyl propiophenone, etc., polymers are of less value for the preparation of light-sensitive polymers. However, copolymers containing both vinyl acetophenone and vinyl propiophenone units are very useful in the invention.

In general, the polymer reacted with the aldehyde need only contain a selected proportion 100 mol. percent or less of the indicated

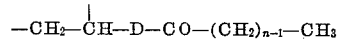

groups where $n$ is 1 to 4. To this end, the vinylketone polymers such as methyl vinylketone homopolymer or copolymers with other polymerizable compounds such as vinyl acetate are useful. In this case the cinnamal acetyl group is attached directly to the carbon chain of the polymer rather than indirectly as in the case when the aldehyde is reacted with polymers such as polyvinylacetophenone.

Results similar to those of the above example are obtained by condensing the cinnamic aldehydes as above with homopolymers and copolymers of the ortho, meta and para acylated styrenes and vinynaphthalenes prepared by the methods of the Williams invention. For example, substantially no difference in physical and chemical properties could be detected between the vinylcinnamalacetophenone polymer of Example 4 and one obtained from p-vinylacetophenone (from p-ethylacetophenone) by condensation with cinnamic aldehyde. Similarly, copolymers of the isomeric acylated vinylbenzenes and naphthalenes behave similarly when condensed with the cinnamic aldehydes.

The polymers of the invention can be sensitized so as to further increase their sensitivity to light by use of the nitro compounds of the Minsk et al. U. S. patent application, Serial No. 148,684, filed March 9, 1950 now U. S. Patent 2,610,120, granted November 7, 1950, and the triphenylmethane, anthrone, quinone and ketone ccompounds of the Minsk et al. application, Serial Nos. 207,048-51, filed January 20, 1951 now U. S. Patents 2,690,966, 2,670,285-7, respectively, particularly for sensitizing those acylated vinylbenzene and naphthalene polymers having inherently low light-sensitivity before sensitization. Contrary to this, the light-sensitive polymers of the Allen et al. invention above mentioned are not sensitized by these compounds.

The polymers of the invention are particularly useful for photomechanical purposes where it is desired to prepare a resist image on a given surface. For example, the polymer is coated from solvent upon a support such as a metal plate, paper or organic colloid surface; for example, especially upon a surface which when moistened repels greasy printing inks, such as lithographic paper plate, and after exposure to the desired line or halftone subject, the unexposed areas are dissolved away, leaving a resist image on the original support. At this stage, if the resist has been formed on a surface repelling greasy inks when moistened, the element can be used directly as a printing plate. In other cases, the support, such as a metal plate, can be etched out in a well known manner to obtain an etched metal printing plate. Other uses for our polymers employing their light-sensitive properties will occur to those skilled in the art. For example, the polymers can be employed to form continuous or discontinuous soluble or insoluble coatings on any surface or object to which they will adhere, in the latter case exposure to light being employed to insolubilize the coating.

The light-sensitive polymers can be used for photographic reproduction of line, halftone or continuous tone subjects. In the latter case it is preferable to coat the polymer on a transparent support, expose the coating through the support followed by washing away the least exposed areas with a solvent leaving a continuous tone relief image on the support which may be colored previously or subsequently with subtractively colored dyes or for purposes of color photography. Three such subtractively colored reliefs corresponding to blue, green and red aspects of a subject can then be superimposed to obtain a natural color reproduction or three such images may be formed on a single support by successively coating layers of the polymers on the support after first forming relief images thereon corresponding to one or more of the red, green and blue aspects of the original subject. Thus, after forming a yellow colored relief on the support, a layer of polymer is coated thereon and the magenta relief is formed on top of the yellow relief and so on for the cyan relief.

What we claim is:

1. A polymer containing recurring units having the general formula

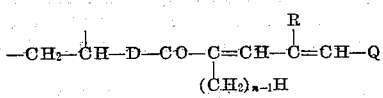

wherein $n$ represents a positive integer of from 1 to 4, Q represents a univalent aromatic monocyclic radical of the benzene series whose free valence belongs to the aromatic nucleus, D represents a bivalent aromatic radical whose free valences belong to the aromatic nucleus and which radical is selected from the group consisting of monocyclic radicals of the benzene series and bicyclic radicals of the naphthalene series, and R represents a member of the class consisting of a hydrogen atom and alkyl groups of from 1 to 5 carbon atoms.

2. A polymer containing recurring units having the general formula

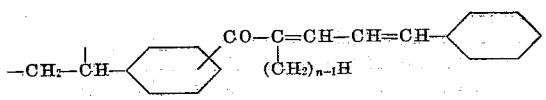

wherein $n$ represents a positive integer of from 1 to 4.

3. A polymer containing recurring units having the general formula

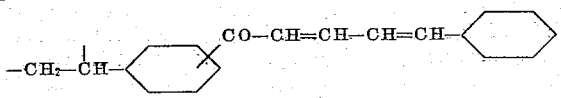

4. A polymer containing recurring units having the formula

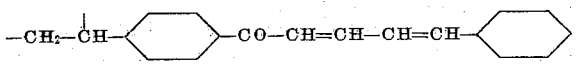

5. A polymer containing recurring units having the formula

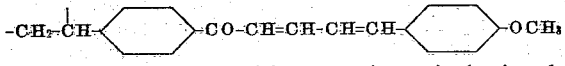

6. A copolymer comprising recurring units having the structures

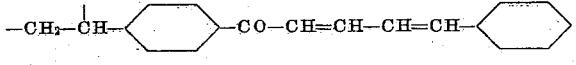

and

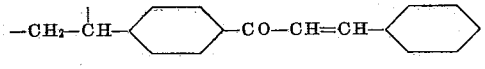

7. A process for preparing a polymer which comprises condensing in the presence of a condensation catalyst, an aldehyde having the general formula

R—CH=CH—CHO wherein R represents a univalent aromatic monocyclic-radical of the benzene series whose free valence belongs to the aromatic nucleus with a polymer containing recurring units having the general formula

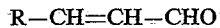

wherein D represents a bivalent aromatic radical whose free valences belong to the aromatic nucleus and which radical is selected from the group consisting of monocyclic radicals of the benzene series and bicyclic radicals of the naphthalene series, and $n$ represents a positive integer of from 1 to 4.

8. A process for preparing a polymer which comprises condensing, in the presence of a condensation catalyst, an aldehyde having the general formula

R—CH=CH—CHO wherein R represents a univalent aromatic monocyclic-radical of the benzene series whose free valence belongs to the aromatic nucleus with a polymer containing recurring units having the general formula

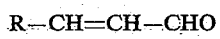

wherein D represents a phenylene group.

9. A process for preparing a polymer which comprises acetylating aromatic nuclei of a styrene polymer and condensing the resulting ar-vinylacetophenone polymer with an aldehyde having the general formula

R—CH=CH—CHO wherein R represents a univalent aromatic monocyclic-radical of the benzene series whose free valence belongs to the aromatic nucleus in the presence of a condensation catalyst.

10. A process for preparing a polymer which comprises polymerizing an ar-vinylacetophenone with a compound containing a polymerizable —CH=C< group and condensing acetyl groups of the resulting polymer with an aldehyde having the general formula

R—CH=CH—CHO wherein R represents a univalent aromatic monocyclic-radical of the benzene series whose free valence belongs to the aromatic nucleus, in the presence of a condensation catalyst.

References Cited in the file of this patent

UNITED STATES PATENTS 2,332,897    D'Alelio _____ Oct. 26, 1943

OTHER REFERENCES

Webster's New International Dictionary, 2nd edition, Merriam—Webster, page 158, item "aryl."